United States Patent [19]

Pontoglio

[11] 4,381,392
[45] Apr. 26, 1983

[54] METHOD FOR REMOVING CHLORINATED SOLVENTS FROM CHLORINATED POLYMERS

[75] Inventor: Enrico Pontoglio, Brescia, Italy

[73] Assignee: Caffaro S.p.A., Milan, Italy

[21] Appl. No.: 247,206

[22] Filed: Mar. 24, 1981

Related U.S. Application Data

[63] Continuation of Ser. No. 78,510, Sep. 24, 1979, abandoned.

[30] Foreign Application Priority Data

Oct. 2, 1978 [IT] Italy .............................. 28330 A/78
Oct. 2, 1978 [IT] Italy .............................. 51322 A/78

[51] Int. Cl.$^3$ ............................ C08F 6/00; C08F 6/12
[52] U.S. Cl. ................................. 528/493; 528/483; 528/491; 528/492; 528/494; 528/496; 528/498; 528/501
[58] Field of Search ....................... 528/493, 490, 491
[56] References Cited

U.S. PATENT DOCUMENTS

| | | | |
|---|---|---|---|
| 3,062,795 | 11/1962 | Cain | 528/493 |
| 3,355,442 | 11/1967 | Taylor | 525/356 |
| 3,464,966 | 9/1969 | Watson | 528/491 |
| 4,006,126 | 2/1977 | Rettore | 525/355 |
| 4,049,897 | 9/1977 | Houslay | 528/483 |
| 4,122,249 | 10/1978 | Padget | 528/486 |
| 4,147,859 | 4/1979 | Davis et al. | 528/496 |

FOREIGN PATENT DOCUMENTS

| | | |
|---|---|---|
| 433196 | 8/1935 | United Kingdom . |
| 826495 | 1/1960 | United Kingdom . |
| 1188032 | 4/1970 | United Kingdom . |
| 1338039 | 11/1973 | United Kingdom . |
| 1373805 | 11/1974 | United Kingdom . |

*Primary Examiner*—C. A. Henderson
*Attorney, Agent, or Firm*—Stevens, Davis, Miller & Mosher

[57] ABSTRACT

Method for removing chlorinated solvents from chlorinated polymers which retain them as a result of a chlorination process, wherein after being dried and pulverized, said chlorinated polymer is treated with a non-halogenated aliphatic organic solvent or a halogenated aromatic organic solvent. Said organic solvent pertains to the following groups: alcohols such as methanol, ethanol, isopropanol; esters such as methyl formate, ethyl formate, methyl acetate; nitriles such as acetonitrile; aromatic halides such as chlorobenzene; hydrocarbons such as n-hexane; and acetone.

9 Claims, No Drawings

METHOD FOR REMOVING CHLORINATED SOLVENTS FROM CHLORINATED POLYMERS

This is a continuation of application Ser. No. 78,510 filed Sept. 24, 1979, now abandoned.

BACKGROUND OF THE INVENTION

This invention relates to a process for reducing to a very low level the content of the solvent, generally a halogenated hydrocarbon and in particular carbon tetrachloride, which remains stubbornly incorporated in chlorinated polymers. In this respect, these latter can be produced by chlorinating, with gaseous chlorine, polymers such as rubber, polyethylene, polybutadiene, polypropylene etc. dissolved in said halogenated solvent, then removing the greater part of the solvent by spraying the solution into hot water, and drying the product obtained by conventional methods such as heating with or without vacuum.

However, a certain quantity of solvent (4–8% by weight), particularly carbon tetrachloride, remains incorporated in the chlorinated polymer and is difficult to remove by ordinary means without using a considerable amount of time and energy, to the detriment of the process economy.

Said halogenated solvent, for example carbon tetrachloride, also leads to considerable problems during the use of the chlorinated polymer because when this latter is dissolved in suitable solvents for various uses such as preparing points, the carbon tetrachloride or other halogenated solvents used in the polymer chlorination process become released, so contaminating the atmosphere and creating environmental toxicity problems.

SUMMARY OF THE INVENTION

The object of the present invention is to solve these problems by providing a method for removing halogenated solvents, in particular carbon tetrachloride, from chlorinated polymers containing them, such as chlorinated rubber, chlorinated polyethylene etc., wherein after being dried and pulverised, said chlorinated polymer is treated with a non-halogenated aliphatic organic solvent or a halogenated aromatic organic solvent from the following groups: alcohols such as methanol, ethanol, isopropanol; esters such as methyl formate, ethyl formate, methyl acetate; ethers such as diisopropyl ether; nitriles such as acetonitrile; aromatic halides such as chlorobenzene; hydrocarbons such as n-hexane; and acetone.

PREFERRED EMBODIMENTS

In a first embodiment of the process according to the invention, said treatment comprises reducing into powder form said chlorinated polymer containing said halogenated solvent such as carbon tetrachloride, and then passing through said polymer, vapours of one of said solvents as such and at a temperature exceeding the boiling point of the solvent.

If the solvent has a boiling point less than 100° C., then the operation is carried out at ordinary pressure. If the boiling point of the treatment solvent is high as in the case of chlorobenzene, the operation is carried out at reduced pressure in order not to change the physical characteristics of the chlorinated polymer, in particular chlorinated rubber.

At the end of treatment, a stream of inert gas (for example nitrogen) is passed through the powdered chlorinated polymer in order to remove the treatment solvent vapour, or alternatively the powdered chlorinated polymer is heated for a short time under vacuum.

The content of halogenated solvent, and in particular carbon tetrachloride, in the chlorinated polymer after treatment is very low, and if acetone is used as the treatment solvent, it is nearly always below 0.1% by weight of the chlorinated polymer weight.

Said treatment solvents can be recovered by simple cooling after they have been in contact at the required temperature with the chlorinated polymer.

A fact of particular importance is that the aforesaid solvents can be reused after recovery without totally removing the carbon tetrachloride from them. For example, in the particular case of treatment with acetone, instead of using pure acetone vapour, a mixture of acetone and carbon tetrachloride vapours can be used in various weight ratios, for example 80:20.

In this case, the solvent of the preparation process (carbon tetrachloride) is not removed to the same low level as is attained if using pure acetone. Nevertheless, the carbon tetrachloride content in the chlorinated polymer after treatment is less than 1%.

Better results are obviously obtained by using a mixture of acetone and carbon tetrachloride vapours in a weight ratio exceeding 80:20.

This enables industrial processes to use acetone recovered from previous treatments and still containing part of the carbon tetrachloride subtracted from the chlorinated polymer.

According to a further embodiment of the present invention, the carbon tetrachloride can be removed from the chlorinated polymer by passing an inert gas (for example nitrogen) saturated with the vapour of one of said solvents through the powdered polymer at a temperature not exceeding 100°–110° C. In this case, said inert diluting gas is saturated with the vapour of the treatment solvent by bubbling it through, at a temperature equal or less than the treatment temperature, which can also be ambient temperature (for example 25° C.).

The solvent bonded to the chlorinated polymer is obviously removed in a shorter time at higher than ambient temperature, and the opposite is true at lower than ambient temperature.

Said treatment can also be carried out at reduced pressure.

In a further embodiment of the method according to the present invention, it is possible to remove the carbon tetrachloride stubbornly bonded to the chlorinated polymer by adding to the powdered chlorinated polymer (at ambient temperature) acetone mixed with water, under agitation to homogenise the mass, and then filtering and drying the polymer. Said water/acetone mixture is used in a concentration which can vary fairly widely, preferably between 1:1 and 1.5:1 by weight.

DETAILED DESCRIPTION

In order to better illustrate the method according to the invention, some examples of application are given hereinafter, but are not to be considered as limiting the scope of the invention.

EXAMPLE 1

100 g of powdered chlorinated rubber prepared by chlorinating depolymerised rubber dissolved in carbon tetrachloride with gaseous chlorine, then spraying the solution into hot water, then drying it under vacuum with the application of heat to remove the water and most of the solvent, then pulverising it, prove on analysis to still contain 5.5% of carbon tetrachloride. This powdered chlorinated rubber is heated to 90° C. and ethyl alcohol vapour heated to 90° C. is passed through it.

After two hours of treatment, the chlorinated rubber is freed from the ethyl alcohol vapour by scrubbing with gaseous nitrogen or by heating under vacuum for one hour.

The carbon tetrachloride content of the chlorinated rubber is 0.5%.

EXAMPLE 2

The operation is carried out as in example 1, but methyl alcohol at a temperature of about 80° C. is used instead of the ethyl alcohol.

The final carbon tetrachloride content is 1.5%.

EXAMPLE 3

The operation is carried out as in example 1, but isopropyl alcohol is used instead of ethyl alcohol. The treatment temperature is around 95° C.

The final carbon tetrachloride content is 1%.

EXAMPLE 4

The operation is carried out as in example 1, but ethyl formate is used instead of ethyl alcohol, and the treatment temperature is 80° C.

The final carbon tetrachloride content is 0.3% by weight.

EXAMPLE 5

A stream of chlorobenzene is passes through 50 g of powdered chlorinated rubber containing 5.8% of carbon tetrachloride for about 3 hours, during the course of which 45 g of said solvent are used. The chlorobenzene vapour is prepared by heating the solvent under a vacuum of about 60 mm. During the process, the powdered chlorinated rubber is maintained under gentle agitation in a container heated externally to 90°–95° C. to prevent solvent condensation. At the end of treatment, the product is heated to 90° C. under vacuum.

The resulting chlorinated rubber contains less than 0.2% of carbon tetrachloride.

EXAMPLE 6

A stream of nitrogen saturated with chlorobenzene is passed at 80° C. through 50 g of powdered chlorinated rubber containing 5.8% of carbon tetrachloride.

The powdered chlorinated rubber is maintained under gentle mechanical agitation in a container heated to 90° C.

After about 3 hours, during the course of which about 30 g of chlorobenzene are evaporated, the nitrogen flow is stopped and the chlorinated rubber is heated under vacuum at 90° C. The carbon tetrachloride content is 0.3%.

EXAMPLE 7

100 g of chlorinated rubber (containing 5.8% of carbon tetrachloride) prepared by chlorinating depolymerised rubber dissolved in carbon tetrachloride with gaseous chlorine, then spraying the solution into hot water to separate the solid product, drying it under vacuum to remove the water and part of the solvent, and finally pulverising it, are heated preferably under agitation to a temperature of about 80° C., and acetone vapour at 80° C. is then passed through it.

After about 2 hours of this treatment, during which 50 g of acetone or less are used, nitrogen or another inert gas is passed through the powder or the powder is heated with or without vacuum, in order to remove the acetone vapour.

After cooling, the chlorinated rubber contains a quantity of carbon tetrachloride less than 0.1% by weight.

EXAMPLE 8

A stream of nitrogen saturated with acetone is passed at ambient temperature (about 25° C.) through 100 g of powdered chlorinated rubber prepared in the aforesaid manner (example 1) and containing 5.8% of carbon tetrachloride.

After about 4 hours of treatment, during which about 50 ml of acetone are consumed, the chlorinated rubber is liberated from the acetone vapour by heating under vacuum or by scrubbing with an inert gas (nitrogen). The carbon tetrachloride content is less than 0.2% by weight.

EXAMPLE 9

100 g of powdered chlorinated polyethylene prepared by chlorinating polyethylene dissolved in carbon tetrachloride with gaseous chlorine, spraying it into hot water to remove most of the solvent, then drying it under vacuum and grinding, show on analysis to still contain 1.3% of carbon tetrachloride, which is difficult to remove by the usual methods (evaporation by heating, possibly under vacuum).

A stream of nitrogen saturated with acetone is passed through said 100 g of powder at 30° C.

After about 3 hours of treatment, during which about 50 ml of acetone are consumed, the chlorinated polyethylene is freed from the acetone vapour by heating under vacuum. The final carbon tetrachloride content of the chlorinated polymer is 0.2% by weight.

EXAMPLE 10

A mixture of acetone and carbon tetrachloride vapours in the ratio of 80:20 by weight is passed at a temperature of 80° C. through 100 g of powdered chlorinated rubber prepared as in example 1 and containing 5.8% of carbon tetrachloride.

After 3 hours of treatment, during which about 100 g of said mixture are passed, the powdered chlorinated rubber is freed from the solvent vapour by a stream of nitrogen (or by heating it for a short time under vacuum).

The amount of carbon tetrachloride remaining in the chlorinated rubber treated in this manner is 0.8% by weight.

EXAMPLE 11

160 g of a mixture of water and acetone in the ratio of 1.5:1 by weight are added at ambient temperature under agitation to 40 g of powdered chlorinated rubber containing 5.8% of carbon tetrachloride. After about 1 hour it is filtered, and the powder is dried under vacuum.

The carbon tetrachloride content of the dried powdered rubber is 0.3% by weight.

What I claim is:

1. A method for removing chlorinated solvents contained in chlorinated polymers comprising treating said chlorinated polymer in dry powder form with an inert gas saturated with acetone vapour.

2. The method as claimed in claim 1, wherein said treatment is carried out at room temperature.

3. The method as claimed in claim 1, wherein said inert gas is nitrogen and said treatment is carried out at temperatures in excess of room temperature.

4. A method for removing chlorinated solvents contained in chlorinated polymers comprising treating said chlorinated polymer in dry powder form with acetone in vapour form, said polymer being at a temperature exceeding the boiling point of acetone.

5. A method for removing chlorinated solvents contained in chlorinated polymers comprising treating said chlorinated polymer in dry powder form with vapours of acetone mixed with carbon tetrachloride.

6. The method as claimed in claim 5, wherein said acetone and carbon tetrachloride mixture is used in a weight ratio of at least 80:20, respectively.

7. A method for removing chlorinated solvents contained in chlorinated polymers comprising treating said chlorinated polymer in dry powder form with acetone mixed with water under agitation, filtering said treated polymer and drying said filtered polymer.

8. The method according to claim 7, wherein said acetone and water mixture is used in a ratio preferably lying between 1:1 and 1,5:1 by weight respectively.

9. The method according to claim 7, wherein said treatment is carried out at room temperature.

* * * * *